United States Patent [19]

Hashimoto et al.

[11] Patent Number: 4,691,158

[45] Date of Patent: Sep. 1, 1987

[54] METHOD OF OPERATING A SECONDARY BATTERY TO RECONDITION THE BATTERY

[75] Inventors: Takafumi Hashimoto; Yoshihide Kamanaka; Tadashi Ashikaga, all of Tokyo, Japan

[73] Assignee: Kabushiki Kaisha Meidensha, Tokyo, Japan

[21] Appl. No.: 736,213

[22] Filed: May 20, 1985

[51] Int. Cl.⁴ .............................................. H02J 7/00
[52] U.S. Cl. ........................................ 320/14; 320/4; 320/26
[58] Field of Search ...................... 320/4, 5, 2, 26, 14, 320/25; 204/144

[56] References Cited

U.S. PATENT DOCUMENTS

| | | | |
|---|---|---|---|
| 2,619,624 | 11/1952 | Briggs, Jr. | 320/26 X |
| 3,950,689 | 4/1976 | Jamison | 320/5 |
| 4,342,954 | 8/1982 | Griffith | 320/14 |

FOREIGN PATENT DOCUMENTS

| | | |
|---|---|---|
| 57-19976 | 2/1982 | Japan. |
| 57-143273 | 9/1982 | Japan. |
| 58229875 | 7/1985 | Japan. |
| 58229876 | 7/1985 | Japan. |
| 1599076 | 9/1981 | United Kingdom. |

OTHER PUBLICATIONS

Charles P. Wales, "Charging the Silver Oxide Electrode with Periodically Varying Current", J. Electrochem. Soc.: Electrochemical Science, vol. 115, No. 10, pp. 985-990, Oct., 1968.

*Primary Examiner*—Patrick R. Salce
*Assistant Examiner*—Anita M. Ault
*Attorney, Agent, or Firm*—Fleit, Jacobson, Cohn & Price

[57] ABSTRACT

A secondary battery operating method for charging and discharging a secondary battery using zinc as the negative electrode active material. After the termination of the normal discharge, direct current supply means is connected to the secondary battery in opposite polarity relation with each other and the secondary battery is reverse charged in a polarity opposite to the normal polarity. As a result of this reversed charge, the zinc remaining on the negative electrode after the termination of the normal discharge is completely dissolved into the electrolyte. If necessary, the energy stored in the secondary battery after the termination of the normal discharge is regenerated during the reversed charge.

8 Claims, 8 Drawing Figures

D: DRIVING
R: REGENERATING

METHOD OF OPERATING A SECONDARY BATTERY TO RECONDITION THE BATTERY

BACKGROUND OF THE INVENTION

The present invention relates to a method of operating a secondary battery to recondition the battery, in which the battery repeats charge and discharge cycles, and more particularly a method of operating a secondary battery to recondition the battery in which zinc (Zn) is used as the negative electrode active material.

Examples of the secondary battery using zinc (Zn) as the negative electrode active material include a zinc-bromine, zinc-chlorin, nickel-zinc, air-zinc battery, etc. The operation of this type of secondary battery to recondition the battery is effected by a complete discharge method with intent to completely dissolve the zinc on the negative electrode for the purpose of increasing the charge and discharge battery life. With this complete discharge operation, the secondary battery is discharged until the battery voltage and the load current are substantially reduced to zero.

However, even if the complete discharge operation is performed, the zinc on the negative electrode is not completely dissolved and some of the zinc remains on the negative electrode. As a result, when the charge of the next cycle is effected, the zinc is further electrodeposited on the remaining zinc on the negative electrode. Depending on the conditions, this electrodeposition of the zinc takes the form of an abnormal electroposition which is called as a dendrite. Thus, if the abnormal electrodeposition causes the zinc to extend to the positive electrode, this gives rise to a problem of battery short-circuit. Moreover, where the battery has a large size and a large capacity, the above-mentioned complete discharge operation consumes a large amount of electric power wastefully.

SUMMARY OF THE INVENTION

It is an object of the present invention to prevent the occurrence of any abnormal electrodeposition of zinc during the charging of a secondary battery.

It is another object of the invention to increase the charge and discharge cycle life of a secondary battery.

It is still another object of the invention to ensure efficient use of the electric power of a secondary battery.

A secondary battery operating method according to the invention features that a reversed charge of a secondary battery is performed after the completion of its normal discharge. The reversed charge of the secondary battery is effected by electrically connecting direct current supply means to the secondary battery in opposite polarity relation with respect to each other.

More specifically, the secondary battery subjected to the reversed charge is also subjected to a reversed discharge operation. This reversed discharge operation is effected by electrically connecting the direct current supply means to the secondary battery so that they have the same polarity.

During the reversed charge and discharge, the energy generated from the secondary battery is regenerated by means which is capable of converting the dc power to a stepped-up ac power.

The above and other objects, features and advantages of the present invention will become apparent from the following detailed description taken with the accompanying drawings.

DESCRIPTION OF THE PREFERRED EMBODIMENTS

While the secondary battery operating method of the present invention is susceptible to numerous physical embodiments, depending upon the environment and requirements of use, substantial numbers of the herein shown and described embodiments have been made, tested and used, and all have performed in an eminently satisfactory manner. Firstly, the conventional secondary battery operating method will be described with reference to FIGS. 1 and 2 of the accompanying drawings.

Figure 1:
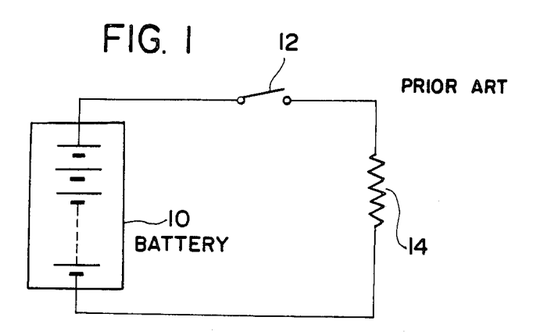
FIG. 1 is a circuit diagram for explaining a conventional method of operating a secondary battery.

FIG. 1 shows a circuit for effecting the complete discharge of a battery stack of secondary cells 10. The secondary battery 10 is connected to a charging and discharging circuit which is not shown. The charging and discharging circuit includes a load which is supplied with the power from the secondary battery 10. In FIG. 1, the secondary battery 10 is connected to a series circuits of a switch 12 and a resistor 14.

Figure 2:
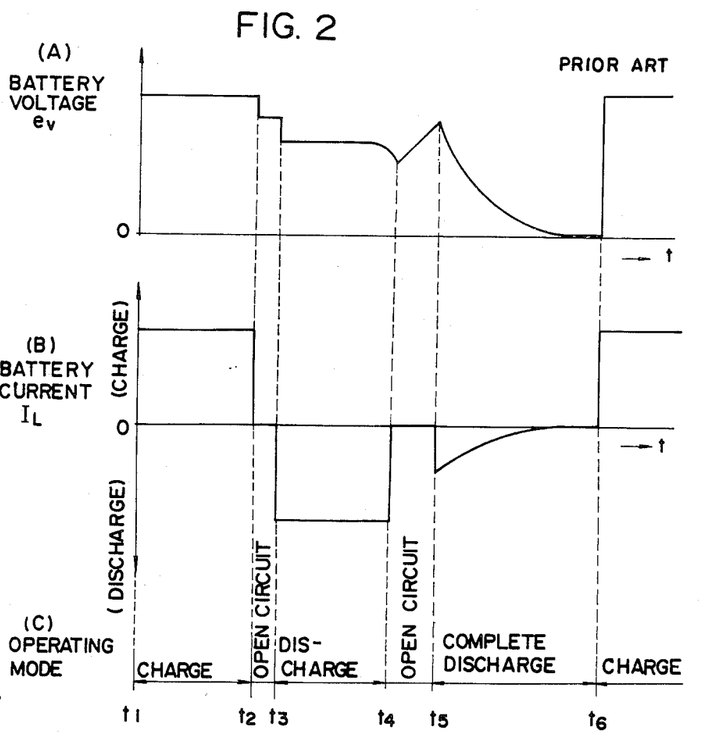
FIGS. 2(A) to (C) are waveform diagrams showing the conventional secondary battery operating method.

Referring now to FIG. 2, there are illustrated variations in the voltage and current of the secondary battery 10 when its charge, discharge and said complete discharge are effected. Shown in (C) are the modes of operation of the secondary battery 10. In FIGS. 2(A) to (C), the secondary battery 10 is charged from a time $t_1$ to a time $t_2$ by the charging and discharging circuit which is not shown. During the time interval from $t_2$ to $t_3$, the charging and discharging circuit is opened. During the time interval from $t_3$ to $t_4$, the power is supplied to the load from the secondary battery 10 through the charging and discharging circuit and the secondary battery 10 is discharged. During the interval from $t_4$ to $t_5$, the charging and discharging circuit is again opened.

Then, during the interval from $t_5$ to $t_6$, the complete discharge of the secondary battery 10 is effected. The switch 12 shown in FIG. 1 is closed first at the time $t_5$. This operation electrically switchably connects the positive and negative electrodes of the secondary battery 10 to the resistor 14 and the complete discharge of the secondary battery 10 is started. Upon the discharge, the battery voltage is gradually decreased as shown in FIG. 2(A) and also the battery current is decreased gradually as shown in (B). The battery voltage and current of the secondary battery 10 become substantially equal to zero at the time $t_6$. At the time $t_6$, the complete discharge operation is completed and the charge of the next cycle is effected.

In the case of a secondary battery using zinc as the negative electrode active material, generally the zinc deposits on the negative electrode during the charge and upon the discharge the zinc on the negative electrode is dissolved into the electrolyte. When the complete discharge is effected, the zinc on the negative electrode must be dissolved into the electrolyte. However, even if the battery voltage of the secondary battery is reduced to zero as a result of the complete discharge, some zinc on the negative electrode is not dissolved completely into the electrolyte. Therefore, when the charge of the next cycle is effected, the zinc is further electrodeposited on the remaining zinc on the negative electrode. If this electrodeposition of the zinc develops to an abnormal electrodeposition which is called as dendrite, then the battery is short-circuited finally.

On the other hand, if the complete discharge of a large-capacity secondary battery is effected, a considerable amount of electric power is wasted.

Referring now to FIGS. 3 to 6, a description will be made of a novel and improved secondary battery operating method according to the invention which has overcome the foregoing disadvantages of the conventional operating method.

Figure 3:
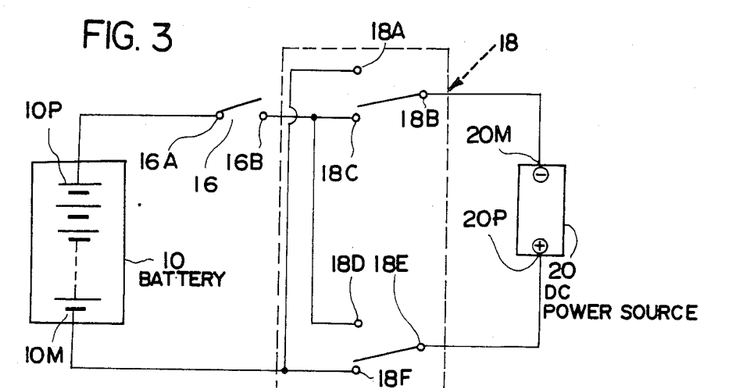
FIG. 3 is a circuit diagram for explaining an embodiment of a method of operating a secondary battery according to the invention.

FIG. 3 shows an exemplary circuit for performing an operating method according to an embodiment of the invention. In the Figure, a positive electrode 10P of a battery stack of secondary cells; 10 is electrically connected to a contact 16A of a switch 16. A negative electrode 10M of the secondary battery 10 and the other contact 16B of the switch 16 are electrically connected to a polarity switch 18.

The polarity switch 18 includes contacts 18A, 18B, 18C, 18D, 18E and 18F. With these contacts, the contacts 18A and 18F are interconnected and the contacts 18C and 18D are interconnected. The contact 16B of the switch 16 is connected to each of the contacts 18C and 18D of the polarity switch 18. The negative electrode 10M of the secondary battery 10 is connected to each of the contacts 18A and 18F of the polarity switch 18.

The contact 18B of the polarity switch 18 is electrically connected to a negative terminal 20M of a dc power source 20. Also, the contact 18E of the polarity reversing switch 18 is electrically connected to a positive terminal 20P of the dc power source 20. In the polarity reversing switch 18, the contact 18B is switchably connected to either of the contacts 18A and 18C. Also, the contact 18E is switchably connected to either of the contacts 18D and 18F. The interconnections of these contacts are made in an interlocked manner. When the contact 18B is connected to the contact 18A, the contact 18E is connected to the contact 18D. Thus, the positive electrode 10P of the secondary battery 10 is electrically connected to the positive terminal 20P of the dc power source 20 and the negative electrode 10M of the secondary battery 10 is electrically connected to the negative terminal 20M of the dc power source 20. On the other hand, when the contact 18B of the polarity switch 18 is connected to the contact 18C, the contact 18E is connected to the contact 18F. Thus, the positive electrode 10P of the secondary battery 10 is electrically connected to the negative terminal 20M of the dc power source 20 and the negative electrode 10M of the secondary battery 10 is electrically connected to the positive terminal 20P of the dc power source 20.

It is to be noted that the secondary battery 10 is electrically connected to a charging and discharging circuit which is not shown. The charging and discharging circuit includes a load which is supplied with the power from the secondary battery 10.

Figure 4:
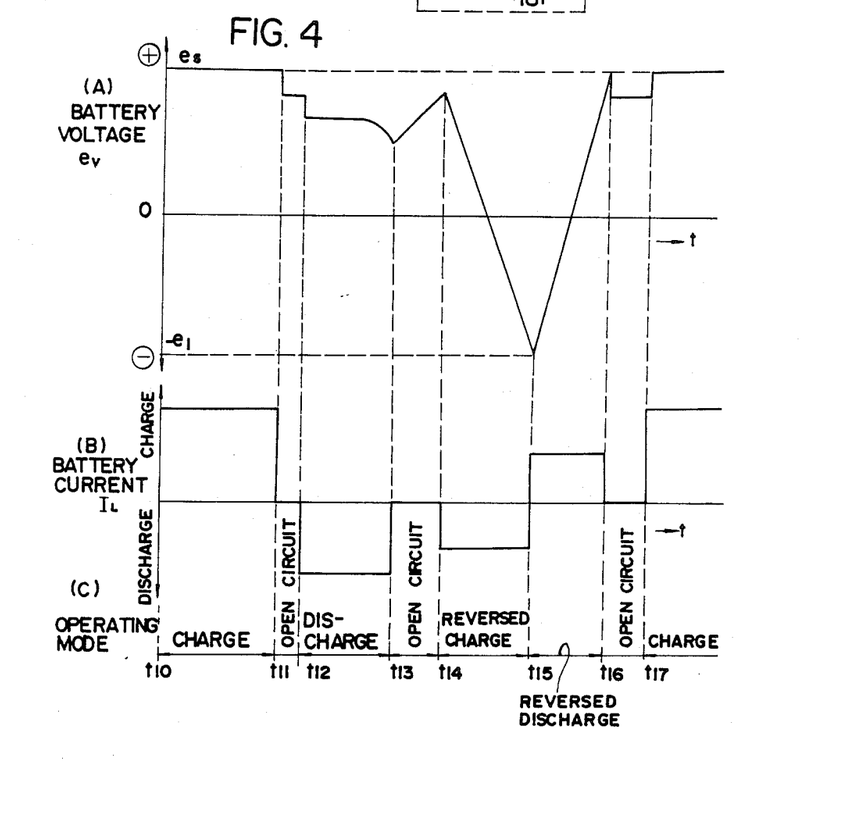
FIG. 4 shows waveforms useful for explaining the embodiment of the invention.

The operating method according to the embodiment will now be described with reference to FIG. 3 as well as FIGS. 4(A) to (C). FIG. 4(A) shows variations in the battery voltage of the secondary battery 10 when the operating method of the embodiment is performed. Shown in (B) are variations in the battery current of the secondary battery 10 in the similar case. Also, shown in (C) are the modes of operation in the similar case.

The charge of the secondary battery 10 is effected first during the interval from $t_{10}$ to $t_{11}$ in FIG. 4. This charge is effected with a constant voltage and current by the charging and discharging circuit which is not shown. Note that the polarity switch 18 shown in FIG. 3 is open. During the interval from $t_{11}$ to $t_{12}$, the charging and discharging circuit is opened. In this period, the battery voltage $e_v$ of the secondary battery 10 is lower slightly than the battery charging battery voltage value $e_s$.

Then, during the interval from $t_{12}$ to $t_{13}$, the secondary battery 10 is discharged by the charging and discharging circuit which is not shown. In this period, the discharging current flows constantly throughout the period, the discharging voltage remains essentially constant until the final stage of the period and then decreases gradually in a small amount, and the power is supplied to the load. This discharging voltage is lower than the open battery voltage $e_v$ of the secondary battery 10. Note that the direction of the battery current $I_L$ flowing upon the discharge is opposite to the current flowing upon the charge.

Then, during the interval from $t_{13}$ to $t_{14}$, the discharge is terminated and the charging and discharging circuit is again opened. In this period, the open battery voltage $e_v$ of the secondary battery 10 reaches gradually to a voltage level corresponding to the open battery voltage value at the open circuit period from $t_{11}$ to $t_{12}$ after the charging operation.

Then, during the interval from $t_{14}$ to $t_{15}$, the reversed charge of the secondary battery 10 is effected. Firstly, at the time $t_{14}$, the contact 18B of the polarity switch 18 is connected to the contact 18C and the contact 18E is connected to the contact 18F. Then, the switch 16 is closed. As a result of these switch operations, the positive electrode 10P of the secondary battery 10 is electrically connected to the negative terminal 20M of the dc power source 20 and the negative electrode 10M of the secondary battery 10 is electrically connected to the positive terminal 20P of the dc power source 20. Thus, the reversed charge of the secondary battery 10 is effected. When the reversed charge is effected, the battery voltage $e_v$ of the secondary battery 10 is decreased gradually and it is eventually reversed in polarity. On the other hand, the battery current $I_L$ of the secondary battery 10 flows constantly in the same direction as in the case of the discharge during the interval from $t_{12}$ to $t_{13}$.

At the time $t_{15}$, the battery voltage $e_v$ of the secondary battery 10 becomes a predetermined negative voltage $-e_1$ as shown in FIG. 4(A). At this time, the polarity switch 18 is operated thereby reversing the polarity of the dc power source 20 connected to the secondary battery 10. As a result of this operation, the contact 18B of the polarity switch 18 is connected to the contact 18A and the contact 18E is connected to the contact 18D. Thus, the positive electrode 10P of the secondary battery 10 is electrically connected to the positive terminal 20P of the dc power source 20 and the negative electrode 10M of the secondary battery 10 is electrically connected to the negative terminal 20M of the dc power source 20. As a result of this operation, the reversed discharge of the secondary battery 10 is effected starting at the time $t_{15}$. When the reversed discharge is effected, the battery voltage $e_v$ of the secondary battery 10 is gradually increased from the negative voltage $-e_1$ to approach zero and then it is eventually reversed and restored to the original polarity. On the other hand, the battery current $I_L$ of the secondary battery 10 flows constantly in the same direction as in the case of the charging during the interval from $t_{10}$ to $t_{11}$.

At the time $t_{16}$, the battery voltage $e_v$ of the secondary battery 10 reaches the initial voltage $e_s$ at the end of the charging at the time $t_{11}$ as shown in FIG. 4(A). At this time the switch 16 is opened and then the open battery voltage decreases slightly. The open circuit of the secondary battery 10 by this operation is continued up to a time $t_{17}$, the essential normal charge is effected by the charging and discharging circuit which is not shown.

As described hereinabove, in this embodiment the reversed charge of the secondary battery 10 is effected after the termination of its normal discharge. This reversed charge reverses the polarities of the electrodes 10P and 10M of the secondary battery 10. As a result, the zinc remaining on each negative electrode of the battery stack of secondary cells 10 upon the termination of the normal discharge at the time $t_{13}$ is completely dissolved into the electrolyte by the reversed charge. Thereafter, the reversed discharge is effected and the secondary battery 10 is restored to the normal polarity and state.

It is to be noted that in accordance with the present embodiment the open-circuit mode ($t_{16}$ to $t_{17}$) exists between the reversed discharge mode and the normal charge mode as shown in FIG. 4(C). However, this open-circuit mode is not especially required at all times. Therefore, it is possible to arrange so that the normal charge of the secondary battery 10 is started at the time $t_{16}$. Also, where an electrolyte circulation type battery stack of secondary cells is operated, the electrolyte circulating pumps may be stopped during the operation in the reversed charge mode and the reversed discharge mode, respectively. If the electrolyte circulating pumps are stopped, the electrolytes in each unit cell of the secondary battery 10 are made stationary. For example, the electrolyte circulating pumps which are not shown are stopped at the time $t_{14}$ in FIG. 4 and the operation of the pumps is restarted at the time $t_{17}$. The reversed charge and discharge operations may be performed for every normal charge and discharge cycle of the secondary battery 10 or at intervals of several cycles.

Enumerated below are the results of the tests made by applying the operating method of the above-mentioned embodiment to zinc-bromine battery (battery stack of 24 biopolar secondary cells having each effective electrode area of 750 cm$^2$ and subject to an 8-hour charge with a charging current of 15 A and an average charging voltage of 46.5 V and then to a discharge with a discharging current of 13 A until the battery voltage decreasing to 24 V) and the results obtained were satisfactory in all the cases.

(1) After the discharge, the reversed charge was started with the battery current of 5 A. When the battery voltage reached $-24$ V at the expiration of about 120 minutes, the secondary battery was disassembled and the negative electrode surfaces were observed showing that the zinc on the whole electrode surfaces was dissolved completely.

(2) After the discharge, the reversed charge was started with the battery current of 5 A, and then the reversed discharge was effected with the battery current of 5 A when the battery voltage reached $-24$ V. Then, after the battery voltage had reached $+24$ V, the normal charge was effected with the battery current of 15 A for 8 hours and the secondary battery was disassembled. The observation of the conditions of the electrodeposited zinc on the whole negative electrode surfaces showed that the zinc was electrodeposited uniformly and that there was no abnormal electrodeposition.

(3) In the case of the above (2) where the electrolyte circulating pumps were stopped during the reversed charge and the reversed discharge, it was found that the time required for the battery voltage to reach $-24$ V, during the reversed charge was reduced by about 50 minutes. Note that the time required for the battery voltage to reach $+24$ V during the reversed discharge was conversely increased by above 5 minutes.

(4) Where the normal charge and discharge were effected with a battery current density of 20 mA/cm$_2$, the relationship between the battery current density (the reversed charging current density) during the reversed charge and the battery voltage at the end of the reversed charge (the final reversed charge voltage) showed the proper per-unit-cell values as shown in Table 1.

TABLE 1

| Reversed charging current density | Final reversed charge voltage |
| --- | --- |
| 20 mA/cm$^2$ | $-1.5$ V or less |
| 10 mA/cm$^2$ | $-1.0$ V or less |
| 5 mA/cm$^2$ | $-1.0$ V or less |

(5) In the case of a battery system composed of a plurality of secondary batteries, the secondary battery which has been subjected to the normal discharge may be used as a dc power source for reversed charging and discharging purposes so as to improve the energy efficiency of the battery system on the whole. This type of system is well suited for use as standard battery system for electric power storing means. Next, a second embodiment of the invention will be described with reference to FIGS. 5 and 6.

Figures 5, 6:
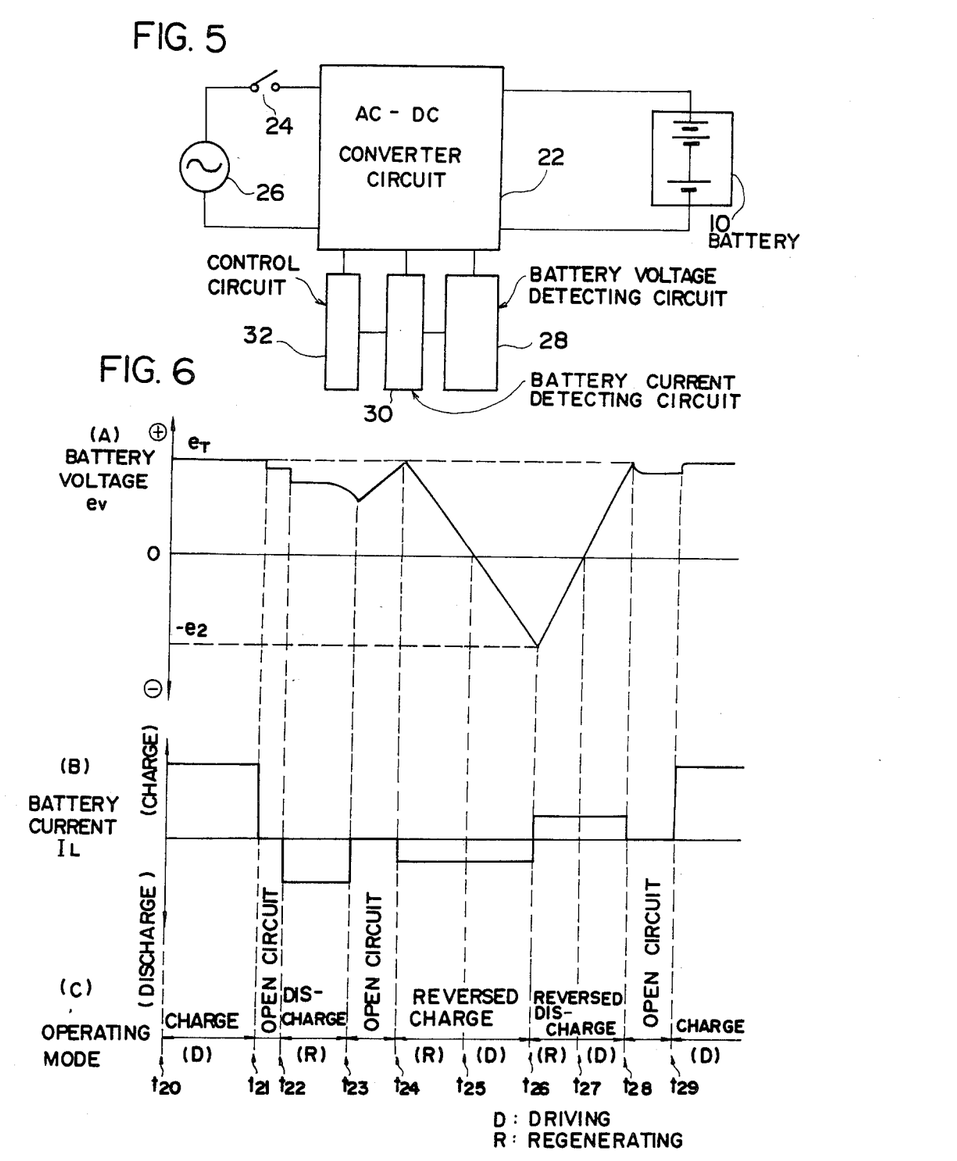
FIG. 5 is a circuit diagram for explaining a second embodiment of the invention.
FIG. 6 shows waveforms useful for explaining the second embodiment of the invention.

FIG. 5 shows an exemplary circuit for performing an operating method according to the second embodiment of the invention. In the Figure, a secondary battery 10 is electrically connected to an ac-dc converter circuit 22 including a step-up and step-down circuit (hereinafter simply referred to as ac-dc converter circuit). The ac-dc converter circuit 22 is also electrically connected to a series circuit of a switch 24 and an ac power source 26.

Electrically connected to the ac-dc converter circuit 22 is a battery voltage detecting circuit 28, a battery current detecting circuit 30 and a control circuit 32. The control circuit 32 controls the operation of the ac-dc converter circuit 22 in accordance with the detection signals from the battery voltage detecting circuit 28 and the battery current detecting circuit 30.

Next, the operating method according to the second embodiment will be described with reference to FIG. 5 and FIGS. 6(A) to (C). FIGS. 6(A) to (C) show the battery voltage $e_v$ and the battery current $I_L$ of the secondary battery 10 during its operation and the modes of operation as in the case of FIG. 4.

Firstly, during the interval from $t_{20}$ to $t_{21}$ in FIG. 6, the switch 24 is closed and the charge of the secondary battery 10 is effected. The ac power from the ac power source 26 is converted to a dc power by the ac-dc converter circuit 22. The charge of the secondary battery 10 is effected by this dc power. The charging voltage and the charging current during the charge are respectively detected by the battery voltage detecting circuit 28 and the battery current detecting circuit 30. In response to the detection signals, the control circuit 32 controls the ac-dc converter circuit 22. This control maintains the charging voltage and the charging current at the desired values as shown in FIGS. 6(A) and (B), respectively.

During the interval from $t_{21}$ to $t_{22}$, the switch 24 is closed and an open-circuit condition is established. It is to be noted that this open-circuit mode is not always required.

Then, during the interval from $t_{22}$ to $t_{23}$, the switch 24 is again closed and the secondary battery 10 is discharged. The dc power from the secondary battery 10 is stepped-up and converted to an ac power by the ac-dc converter circuit 22. Alternatively, the dc power is converted to an ac power and then stepped-up.

Thus stepped-up ac power is returned to the ac power source 26 or regenerated. The current flowing to the ac power source 26 during the discharge is detected by the battery current detecting circuit 30. In response to the detection signal, the control circuit 32 controls the ac-dc converter circuit 22. As a result of this control, the current flowing to the ac power source 26 is controlled at the desired value.

During the interval from $t_{23}$ to $t_{24}$, the switch 24 is again opened and the open-circuit state is established.

Then, during the interval from $t_{24}$ to $t_{26}$, the reversed charge of the secondary battery 10 is effected. In this reversed charge mode, the battery ac-dc converter circuit 22 is electrically connected to the secondary battery 10 in opposite polarity relation with each other. In other words, the secondary battery 10 and the ac-dc converter circuit 22 are electrically connected opposite in polarity to the connections during the charge in the interval from $t_{20}$ to $t_{21}$. As a result of this reversed charge, the battery voltage $e_v$ of the secondary battery 10 is decreased gradually and eventually its polarity is reversed. On the other hand, the battery current $I_L$ of the secondary battery 10 flows constantly in the same direction as in the case of the discharge during the interval from $t_{22}$ to $t_{23}$. At this time, the battery voltage $e_v$ of the secondary battery 10 is detected by the battery voltage detecting circuit 28 and its detection signal is applied to the control circuit 32. Then, the control circuit 32 controls the ac-dc converter circuit 22 in the following manner. Firstly, the ac-dc converter circuit 22 is controlled in such a manner that the dc power from the secondary battery 10 is converted to a stepped-up ac power until the battery voltage $e_v$ is reduced to zero (the interval from $t_{24}$ to $t_{25}$). By virtue of this control, the energy from the secondary battery 10 is regenerated or returned to the ac power source 26. Then, the ac-dc converter circuit 22 is controlled in such a manner that the ac power from the ac power source 26 is converted to a dc power until the battery voltage $e_v$ reaches a predetermined negative voltage $-e_2$ (the interval from $t_{25}$ to $t_{26}$). As a result of this control, the reversed-polarity charge of the secondary battery 10 is effected with the energy from the ac power source 26.

Then, during the interval from $t_{26}$ to $t_{28}$, the reversed discharge of the secondary battery 10 is effected. In this reversed discharge mode, the terminal connections between the ac-dc converter circuit 22 and the secondary battery 10 are electrically interchanged. In other words, the secondary battery 10 and the ac-dc converter circuit 22 are electrically connected in the same polarity relation as in the case of the charge during the interval from $t_{20}$ to $t_{21}$. As a result of this reversed discharge, the battery voltage $e_v$ of the secondary battery 10 is gradually increased from the negative voltage $-e_2$ toward zero and it is eventually reversed to restore its original polarity. On the other hand, the battery current $I_L$ flows constantly in the same direction as in the case of the charge during the interval from $t_{20}$ to $t_{21}$. At this time, the battery voltage $e_v$ of the secondary battery 10 is detected by the battery voltage detecting circuit 28 and its detection signal is supplied to the control circuit 32. Then, the control circuit 32 controls the ac-dc converter circuit 22 in the following manner. Firstly, the ac-dc converter circuit 22 is controlled in such a manner that the dc power from the secondary battery 10 is converted to a stepped-up ac power until the battery voltage $e_v$ is increased from the negative voltage $-e_2$ to zero (the interval from $t_{26}$ to $t_{27}$). As a result of this control, the energy from the secondary battery 10 is returned to the ac power source 26. Then, the ac-dc converter circuit 22 is controlled in such a manner that the ac power from the ac power source 26 is converted to a dc power until the battery voltage $e_v$ is increased from zero to reach a normal-polarity present voltage $e_T$ (the interval from $t_{27}$ to $t_{28}$). As a result of this control, the normal charge of the secondary battery 10 is effected by the energy from the ac power source 26.

Then, at the time $t_{28}$, the battery voltage $e_v$ of the secondary battery 10 is restored to the original voltage $e_T$ as shown in FIG. 6(A). At this time, the switch 24 is opened. The open-circuit condition of the secondary battery 10 by this operation is continued up to a time $t_{29}$. Then, at the time $t_{29}$, the switch 24 is again closed and the essential normal charge is effected.

Figure 7:
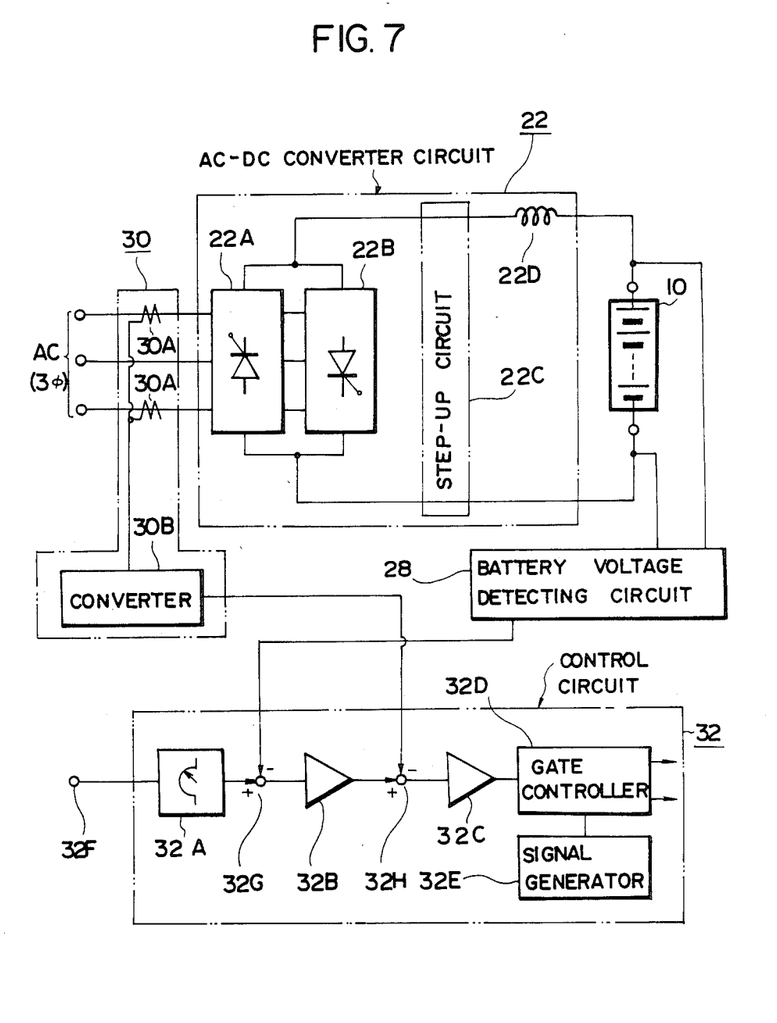
FIG. 7 is a circuit diagram showing detailed example of the second embodiment shown in FIG. 5.

FIG. 7 shows a detailed example of the embodiment shown in FIG. 5. In FIG. 7, the ac-dc converter circuit 22 includes first and second converters 22A and 22B, a step-up circuit 22C and a dc reactor 22D. Of these component parts, each of the converters 22A and 22B comprises switching elements such as thyristors or transistors arranged in a three-phase bridge connection. This connection is generally referred to as a thyristor Ward-Leonard type. The first and second converters 22A and 22B are electrically so that they are opposite in polarity to each other, that is, they are arranged in an inverse parallel connection. The converters 22A and 22B are electrically connected to the ac power source 26. In this embodiment, the ac power source 26 comprises a three-phase power source.

The battery voltage detecting circuit 30 includes current transformers 30A and a converter 30B. The current transformers 30A are each provided in a line for supplying the three-phase ac current to the ac-dc converter circuit 22. Each current transformer 30A detects the current flowing in the supply line. In other words, a current proportional to the current flowing in the three-phase ac supply line is supplied to the converter 30B from each current transformer 30A. The converter 30B converts the value of the applied current to a form suitable for the control by the control circuit 32 and applies the resulting detection signal to the control circuit 32.

The control circuit 32 includes setting means 32A, a battery voltage controlling amplifier 32B, a battery current controlling amplifier 32C, a gate controller 32D and signal generator 32E. Of these component parts, the setting means 32A is provided to preset a desired charged voltage value of the secondary battery 10. A suitable voltage is applied to a terminal 32F and this voltage is divided by a variable resistor thereby presetting the desired charged voltage value. This desired charged voltage value is applied to comparing means 32G. Also applied to the comparing means 32G is the detected value of the battery voltage generated from the battery voltage detecting circuit 28. The detected value and the desired charged voltage value are compared by the comparing means 32G and the difference between the two is applied to the battery voltage controlling amplifier 32B. Then, the battery voltage controlling amplifier 32B applies its output to comparing means 32H. Also applied to the comparing means 32H is the detection signal generated from the converter 30B of the battery current detecting circuit 30. The comparing means 32H compares the inputs and the resulting difference is applied to the battery current controlling amplifier 32C. Then, the battery current controlling amplifier 32C applies its output to the gate controller 32D. The gate controller 32D applies a gate controlling signal or a gate signal to each of the converters 22A and 22B. The generation of the gate signals is controlled in accordance with the output from the signal generator 32E. More specifically, the phase of the gate signal is changed to effect the mode switching between the forward conversion and the inverse conversion operation of the converters 22A and 22B, respectively. In addition, the stopping of the conversion operations, etc., are also effected.

The operation of the apparatus shown in FIG. 7 will now be described. This operation corresponds to a case where the operation shown in FIG. 6 is performed. Assume first that the gate signal generated from the gate controller 32D is controlled in accordance with the command generated from the signal generator 32E thus bringing the converter 22A into the forward conversion operation. As a result of the forward conversion operation, the ac power is converted to a dc power and the secondary battery 10 is charged. This period of operation corresponds to the interval between the times $t_{20}$ and $t_{21}$. During this interval, the battery voltage of the secondary battery 10 is compared with the desired charged voltage value by the comparing means 32G. The difference between the battery voltage and the desired charged voltage value is amplified by the battery voltage controlling amplifier 32B and it is then applied to the comparing means 32H. The comparing means 32H compares the applied difference signal with the detection signal from the battery current detecting circuit 30. The difference between the battery voltage and the detection signal from the battery current detecting circuit 30 is amplified by the battery current controlling amplifier 32c and then applied to the gate controller 32D. The applied difference signal controls the phase of a gate signal generated from the gate controller 32D. This control is effected so that the battery voltage of the secondary battery 10 attains the desired charged voltage value. Thus, as shown in the interval from $t_{20}$ to $t_{21}$ in FIG. 6, the secondary battery 10 is charged with a constant charging voltage and constant charging current.

Then, at the time $t_{21}$, the signal generator 32F applies an open-circuit command for the converter 22A to the gate controller 32D. This stops the application of the gate signal to the converter 22A by the gate controller 32D. As a result, the operation of the converter 22A is stopped. Then, at the time $t_{22}$, the signal generator 32E applies an inverse conversion operation command for the converter 22B to the gate controller 32D. Thus, the gate controller 32D applies a gate signal to the converter 22B. When this occurs, the converter 22B starts its inverse conversion operation and the dc power from the secondary battery 10 is converted to an ac power. The converted ac power is sent back to the power source.

Then, at the time $t_{23}$, the signal generator 32E applies an open-circuit command for the converter 22B, to the gate controller 32D. This stops the application of the gate signal to the converter 22B by the gate controller 32D. As a result, the operation of the converter 22B is stopped. Then, at the time $t_{24}$, the signal generator 32E applies a forward conversion operation command for the converter 22B to the gate controller 32D. Thus, the gate controller 32D applies a gate signal to the converter 22B. This gate signal differs in phase from the gate signal generated during the interval from $t_{22}$ to $t_{23}$. In other words, during the interval from $t_{22}$ to $t_{23}$ the control angle is a lead angle and the converter 22B is controlled correspondingly. On the other hand, during the interval from $t_{24}$ and on, the control angle is a lag angle thus correspondingly controlling the converter 22B. As a result of the forward conversion operation of the converter 22B, the reversed charge of the secondary battery 10 is effected.

Then, when the battery voltage of the secondary battery 10 becomes $-e_2$ at the time $t_{26}$, the signal generator 32E applies an open-circuit command for the converter 22B to the gate controller 32D. At this time, the signal generator 32E also applies an operation command for the converter 22A to the gate controller 32D. Consequently, the operation of the converter 22B is stopped and at the same time the operation of the converter 22A is started thus starting the reversed discharge of the second battery 10. Then, as the time $t_{28}$ is reached, the operation of the converter 22A, is stopped in response to the command from the signal generator 32E. Note that the above-mentioned operations are repeated on and after the time $t_{29}$.

Figure 8:
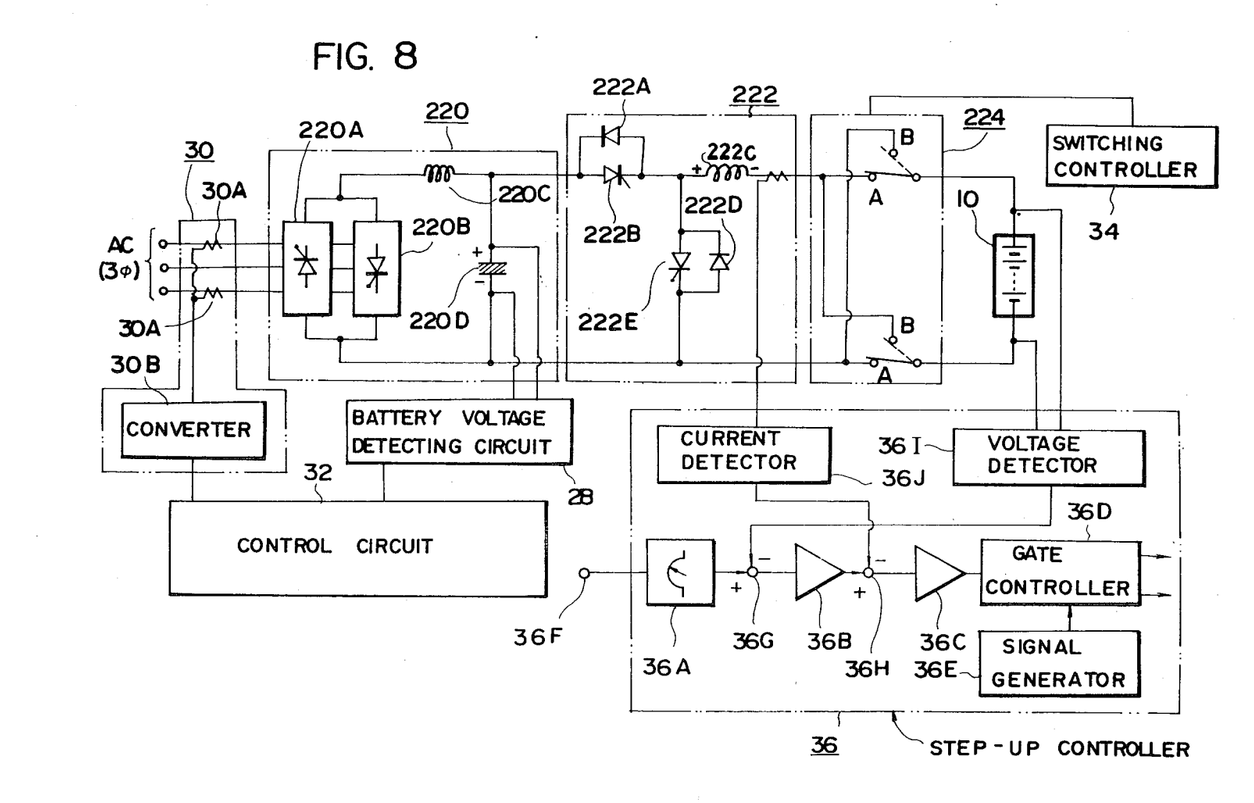
FIG. 8 is a circuit diagram showing another detailed example of the second embodiment shown in FIG. 5.

FIG. 8 shows another detailed example of the embodiment shown in FIG. 5. In FIG. 8, the ac-dc converter circuit 22 comprises a thyristor Ward-Leonard section 220, a step-up circuit 222 and a change-over switch section 224. The thyristor Ward-Leonard section 220 includes converters 220A and 220B arranged in an inverse parallel connection. In this apparatus, the converter 220B operates in a different manner from that of the apparatus shown in FIG. 7. More specifically, the converter 220B performs only the inverse conversion operation and no forward conversion operation is performed. During the reversed charging of the secondary battery 10, the polarity change-over by the change-over switch section 224 is effected and therefore the forward conversion operation of the converter 220B is not required. The change-over switch section 224 is controlled by a switching controller 34.

The step-up circuit 222 is of the known type disclosed in Japanese Pat. No. Publication No. 55-49519. Now beginning with a description of the step-up circuit 222, a thyristor 222B which is in inverse parallel connection with a diode 222A is connected in series between dc reactors 220C and 222C. The thyristor 222B is connected with a polarity such that a current flows to the secondary battery 10 from the converters 220A and 220B, respectively. Connected to the cathode of the thyristor 222B is a thyristor 222E which is in inverse parallel connection with a diode 222D. The thyristor 222E is connected such that its anode is connected to the cathode of the thyristor 222B. The step-up circuit 222 is controlled by a step-up controller 36.

The construction of the step-up controller 36 is substantially the same with the construction of the control circuit 32 shown in FIG. 7. The step-up controller 36 includes setting means 36A, a voltage controlling amplifier 36B, a current controlling amplifier 36C, a gate controller 36D and a signal generator 36E. A suitable voltage is applied to the setting means 36A from a terminal 36F. The step-up controller 36 also includes comparing means 36G and 36H, a voltage detector 36I and a current detector 36J. The voltage detector 36I and the current detector 36J respectively detect the battery voltage and the battery current of the secondary battery 10.

The control of the step-up circuit 222 by the step-up controller 36 will now be described briefly. This control is effected by controlling the duration in each of the alternately interchanging ON period and OFF period of gate signals which are applied to the thyristors 222B and 222E from the gate controller 36D in accordance with the command of said signal generator 36E.

Specifically, with the thyristor 222B ON, the current flows through the converter 220A, the dc reactor 220C, the thyristor 222B, the dc reactor 222C and the secondary battery 10 sequentially. Under this condition, when the thyristor 222B is turned OFF, and ON gate signal is applied to the thyristor 222E (even in this case, the thyristor 222E remains in OFF state, as will be described later), a high voltage of reverse polarity against the polarity shown in FIG. 8 is generated across both ends of dc reactor 222C due to the fact that the current flowing into the dc reactor 222C tends to keep flowing in the same direction. This reverse voltage causes the current to flow through a loop formed with the dc reactor 222C, the secondary battery 10 and the diode 222D. At this moment, a voltage drop occurs across both ends of said diode 222D. Since this dropped voltage has a reverse polarity in relation to the thyristor 222E, the thyristor 222E remains in OFF state no matter whether ON gate signal is applied thereto.

Next, the current flowing through the diode 222D will not be vanished rapidly, but will be reduced gradually to zero as time passes, depending on the amount of energy stored in the dc reactor 222C, and the terminal voltage of the secondary battery 10. At the zero level, the current will then flow reversely through a loop formed with the secondary battery 10, the dc reactor 222C and the thyristor 222E.

Then, when the thyristor 222E is turned OFF and ON gate signal is applied to the thyristor 222B (even in this case, the thyristor 222B remains in OFF state), the current flowing through the thyristor 222E is cut off, with the result that, similarly as mentioned above, a high voltage of same polarity against the polarity shown in FIG. 8 is generated across both ends of the dc reactor 222C, and causes the current to flow through a loop formed with the dc reactor 222C, the diode 222A, the dc reactor 220C, the converter 220B and the secondary battery 10. This current is reduced gradually to zero as time passes, and when the thyristor 222B is turned ON, the current flows in the reverse direction.

In this manner, the thyristors 222B and 222E will repeat their respective ON-OFF operation alternately. During this ON-OFF repetitious operation, if the ON or OFF period of the thyristor 222B, for instance, is equal to the OFF period of the thyristor 222E, the mean value of the current (id) flowing through the dc reactor 222C is null, but if the ON period of the thyristor 222E is longer than that of the thyristor 222B, the mean value of the current (id) becomes a negative value, in which case the current flows from the secondary battery side to the diode 222A side. Accordingly, in the case of the negative mean value of current (id), the electric power is transferred from the secondary battery side to the converter 220B side, whereby the power regeneration is effected to the AC power source by means of the converter 220B.

The following Table 2 shows the ON states of the converters 220A and 220B, the diodes 222A and 222D, the thyristors 222B and 222E and the change-over switch section 224 during the respective operating modes shown in FIG. 6.

TABLE 2

| Operating Mode | Charge (driving) | Discharge (regenerating) | Reversed charge (regenerating) | Reversed charge (driving) | Reversed discharge (regenerating) | Reversed discharge (driving) | Charge |
|---|---|---|---|---|---|---|---|
| Converter Circuit | 220A | 220B | 220B | 220A | 220B | 220A | 220A |
| Step-up Circuit | 222B | 222B or 222E, 222A or 222D | 222B or 222E, 222A or 222D | 222B | 222B or 222E, 222A or 222D | 222B | 222B |
| Change-over switch section | A | A | A | B | B | A | A |

As described hereinabove, in accordance with the second embodiment the ac-dc converter circuit 22 is controlled such that after the normal discharge of the secondary battery 10 has been effected, the reversed charge of the secondary battery 10 is effected. Thus, the zinc remaining on each negative electrode of the battery stack of secondary cells 10 after the normal discharge is completely dissolved into the electrolyte by virtue of the reversed charge.

It is to be noted that in accordance with the second embodiment the use of the open-circuit condition during the interval from $t_{28}$ to $t_{29}$ is arbitrary. Also, in the case of an electrolyte circulation-type battery stack of secondary cells, electrolyte circulating pumps are also stopped as previously during the reversed charge and the reversed discharge. In the second embodiment, the reversed charge and discharge operations may be performed for every charge and discharge cycle of the secondary battery 10 or at intervals of several cycles.

Then, enumerated below are the results of the tests made by applying the operating method of the above-mentioned second embodiment to zinc-bromine battery (battery stack of 24 bipolar secondary cells having each effective electrode area of 750 cm$^2$ and subjected to an 8-hour charge with a charging current of 15 A and average charging voltage of 46.5 V and then to a discharge with a discharge current of 13 A until the battery voltage decreasing to 24 V and the satisfactory results were obtained in all the cases. It is to be noted that in the tests, the voltage of the ac power source 26 was 200 V and the ac-dc converter circuit 22 comprised an inverse-parallel connected circuit of a step-up circuit and a thyristor rheonade as disclosed in Japanese Patent Publication No. 55-49519. Also, the battery current detecting circuit 30 detects the currents corresponding to the charging and discharging dc current values in the form of alternating currents.

(1) After the discharge, the reversed charge was started with the battery current of 5 A so that upon the battery voltage reaching −24 V at the expiration of about 120 minutes the secondary battery was disassembled and the negative electrode surfaces were observed showing that the zinc on the whole surfaces was completely dissolved.

(2) After the discharge, the reversed charge was started with the battery current of 5 A and the reversed discharge was effected with the battery current of 5 A upon the battery voltage reaching −24 V. Then, after the battery voltage had reached +24 V, the normal charge was effected with the battery current of 15 A for 8 hours and the secondary battery was disassembled. The observation of the electrodeposited zinc on the whole negative electrode surfaces showed that the electrodeposition was uniform and that there was no abnormal electrodeposition.

(3) The measurement of the amounts of electric power in terms of ac current in the reversed charge mode and the reversed discharge mode showed the results as shown in Table 3 and ultimately the power of 25.4 Wh was regenerated by both of the reversed charge and discharge modes.

TABLE 3

|  | Regeneration | Driving |
| --- | --- | --- |
| 5 Reversed charge mode | 71 Wh | 42 Wh |
| Reversed discharge mode | 2.4 Wh | 6 Wh |

From the foregoing it will be seen that in accordance with the second embodiment the energy stored in the secondary battery is regenerated or returned to the ac power source even in the reversed charge and discharge modes and effective utilization of the energy is ensured.

As described hereinabove, the secondary battery operating method of this invention has the effect of satisfactorily preventing the occurrence of abnormal electrodeposition of zinc and increasing the charge and discharge cycle life of secondary batteries.

As many apparently widely different embodiments of this invention may be made without departing from the spirit and scope thereof, it is to be understood that the present invention is not limited to the specific embodiments thereof except as defined in the appended claims.

What is claimed is:

1. In a method of operating a secondary battery to recondition said battery, in which said battery includes at least one unit cell using zinc as an active material for a negative electrode in an electrolyte and adapted to be charged add discharged repeatedly, the inprovement comprising the steps of:
   (a) discharging said secondary battery until a voltage of said battery has been reduced to a predetermined positive value;
   (b) electrically and switchably connecting a positive electrode of said battery to a negative output terminal of a direct current supply means and connecting a negative electrode of said battery to a positive output terminal of said direct current supply means; and
   (c) flowing a reversed charging current from said negative electrode to said positive electrode in the electrolyte of said battery from said direct current supply means until said battery voltage has been further reduced below a zero value and has reached a predetermined negative value, to cause the zinc on the negative electrode to be completely dissolved into the electrolyte.

2. The method according to claim 1, wherein after said battery voltage has reached the predetermined negative value, said method further comprises the steps of;
   (e) electrically and switchably connecting said positive electrode of the battery to said positive output terminal of the direct current supply means and said negative electrode of said battery to said negative output terminal of the direct current supply means; and
   (f) flowing a reversed discharging current from said positive electrode to said negative electrode in the electrolyte of said battery from said direct current supply means until said battery voltage is increased above the zero value and again has reached a predetermined positive value.

3. The method according to claim 2, wherein said last-mentioned predetermined positive battery voltage value is a battery charging voltage.

4. The method according to claim 3, further comprising the step of initiating a charging operation of said secondary battery after said battery voltage has been increased to said battery charging voltage.

5. The method according to claim 2, wherein circulation of electrolyte in the battery is stopped during the time that said battery voltage is being increased from said predetermined negative value to said last-mentioned predetermined positive value.

6. The method according to claim 2, wherein dc power is provided to said direct current supply means from an ac power source through an ac-dc converter, and wherein during the time that said battery voltage is being increased to the last mentioned predetermined positive zero value from said predetermined negative value, the method further comprises the steps of;
   (d) converting dc power of said battery to a stepped up ac power by means of a step-up circuit of the ac-dc converter; and
   (e) returning said stepped up ac power to the ac power source.

7. The method according to claim 1, wherein circulation of electrolyte in the battery is stopped during the time that said battery voltage is being reduced from the predetermined positive battery discharging voltage to said predetermined negative value.

8. The method according to claim 1, wherein dc power is provided to said direct current supply means from an ac power source through an ac-dc converter, and wherein during the time that said battery voltage is being reduced to the zero value from said predetermined positive battery discharging voltage, the method further comprises the steps of;
   (d) converting dc power of said battery to a stepped up ac power by means of a step-up circuit in the ac-dc converter; and
   (e) returning said stepped up ac power to the ac power source.

* * * * *